(12) United States Patent     (10) Patent No.:   US 12,608,548 B2

Goligorsky     (45) Date of Patent:     Apr. 21, 2026

(54) METHODS AND SYSTEMS FOR PARSING A MIX OF FEATURES AND INSTRUCTIONS INTO A PROMPT

(71) Applicant: Shopify Inc., Ottawa (CA)

(72) Inventor: David Goligorsky, Stockholm (SE)

(73) Assignee: Shopify Inc., Ottawa (CA)

( * ) Notice: Subject to any disclaimer, the term of this patent is extended or adjusted under 35 U.S.C. 154(b) by 163 days.

(21) Appl. No.: 18/315,789

(22) Filed: May 11, 2023

(65) Prior Publication Data

US 2024/0265205 A1      Aug. 8, 2024

Related U.S. Application Data

(60) Provisional application No. 63/483,196, filed on Feb. 3, 2023.

(51) Int. Cl.
G06F 40/289          (2020.01)
G06F 40/205          (2020.01)

(52) U.S. Cl.
CPC .......... G06F 40/289 (2020.01); G06F 40/205 (2020.01)

(58) Field of Classification Search
CPC ............................ G06F 40/289; G06F 40/205
USPC ............................................................. 704/9
See application file for complete search history.

(56) References Cited

U.S. PATENT DOCUMENTS

| | | |
|---|---|---|
| 11,481,545 B1 | 10/2022 | Aviles et al. |
| 2009/0265612 A1 | 10/2009 | Cheney |

| | | | |
|---|---|---|---|
| 2022/0036153 A1 | 2/2022 | O'Malia et al. | |
| 2022/0108079 A1 | 4/2022 | Roisman | |
| 2022/0374608 A1 | 11/2022 | Shazeer et al. | |
| 2023/0112921 A1* | 4/2023 | Cai ........................... | G06F 8/31 |
| | | | 717/104 |
| 2023/0237277 A1* | 7/2023 | Reza ..................... | G06F 40/186 |
| | | | 704/9 |
| 2023/0289515 A1 | 9/2023 | Devadoss | |
| 2023/0297887 A1* | 9/2023 | Gurgu .................... | G06N 20/00 |
| | | | 706/12 |
| 2023/0316001 A1* | 10/2023 | Araki ...................... | G06F 40/35 |
| 2024/0038226 A1* | 2/2024 | Nouri .................... | G10L 15/063 |
| 2024/0070270 A1* | 2/2024 | Mace .................... | G06F 21/554 |
| 2024/0086051 A1 | 3/2024 | Ciminelli | |
| 2024/0111960 A1* | 4/2024 | Earle ....................... | G06F 40/35 |

(Continued)

FOREIGN PATENT DOCUMENTS

| | | | | | |
|---|---|---|---|---|---|
| CN | 111368522 B | * | 1/2024 | ............. | G06Q 40/02 |
| CN | 118528959 A | * | 8/2024 | ............. | B60W 50/10 |
| JP | 2024108932 A | * | 8/2024 | | |

OTHER PUBLICATIONS

Patent Cooperation Treaty, International Search Report for International application No. PCT/CA2023/051099, issued on Nov. 20, 2023, 8 pages.

(Continued)

*Primary Examiner* — Edwin S Leland, III

(74) *Attorney, Agent, or Firm* — Moffat & Co

(57)          ABSTRACT

A computer system and computer-implemented method, the method including receiving text input, the text input including feature inputs and prompt instructions; analyzing the text input to identify the feature inputs and the prompt instructions; and generating a prompt to be provided to a Large Language Model (LLM) based on a prompt template, the feature inputs, and the prompt instructions.

20 Claims, 10 Drawing Sheets

(56) References Cited

U.S. PATENT DOCUMENTS

| | | | |
|---|---|---|---|
| 2024/0127617 A1 | 4/2024 | Amamou | |
| 2024/0143698 A1* | 5/2024 | Shirwadkar | |
| 2024/0184812 A1* | 6/2024 | McDaniel | G06F 40/35 |
| 2024/0185001 A1* | 6/2024 | Nagaraju | G06F 40/284 |
| 2024/0242037 A1* | 7/2024 | Heller | G06F 40/35 |
| 2024/0256423 A1* | 8/2024 | Zhang | G06F 8/71 |
| 2024/0256762 A1 | 8/2024 | Beauchamp | |
| 2024/0265205 A1* | 8/2024 | Goligorsky | G06F 40/205 |
| 2024/0311546 A1* | 9/2024 | Maschmeyer | G06F 40/166 |

OTHER PUBLICATIONS

Mrozewski, "Adding title and heading tags to a Word document", OJS for YDJ, dated Sep. 24, 2021, pp. 79-81, York Digital Journals, York University Libraries, Toronto.

Wu et al., "Promptchainer: Chaining Large Language Model Prompts through Visual Programming", pre-print retrieved from arXiv:2203. 06566, dated Mar. 13, 2022, 10 pages.

Yuan et al., "Wordcraft: Story Writing With Large Language Models", IUI '22: Proceedings of the 27th International Conference on Intelligent User Interfaces, dated Mar. 22, 2022, pp. 841-852, Helsinki, Finland.

* cited by examiner

Predicted class

810

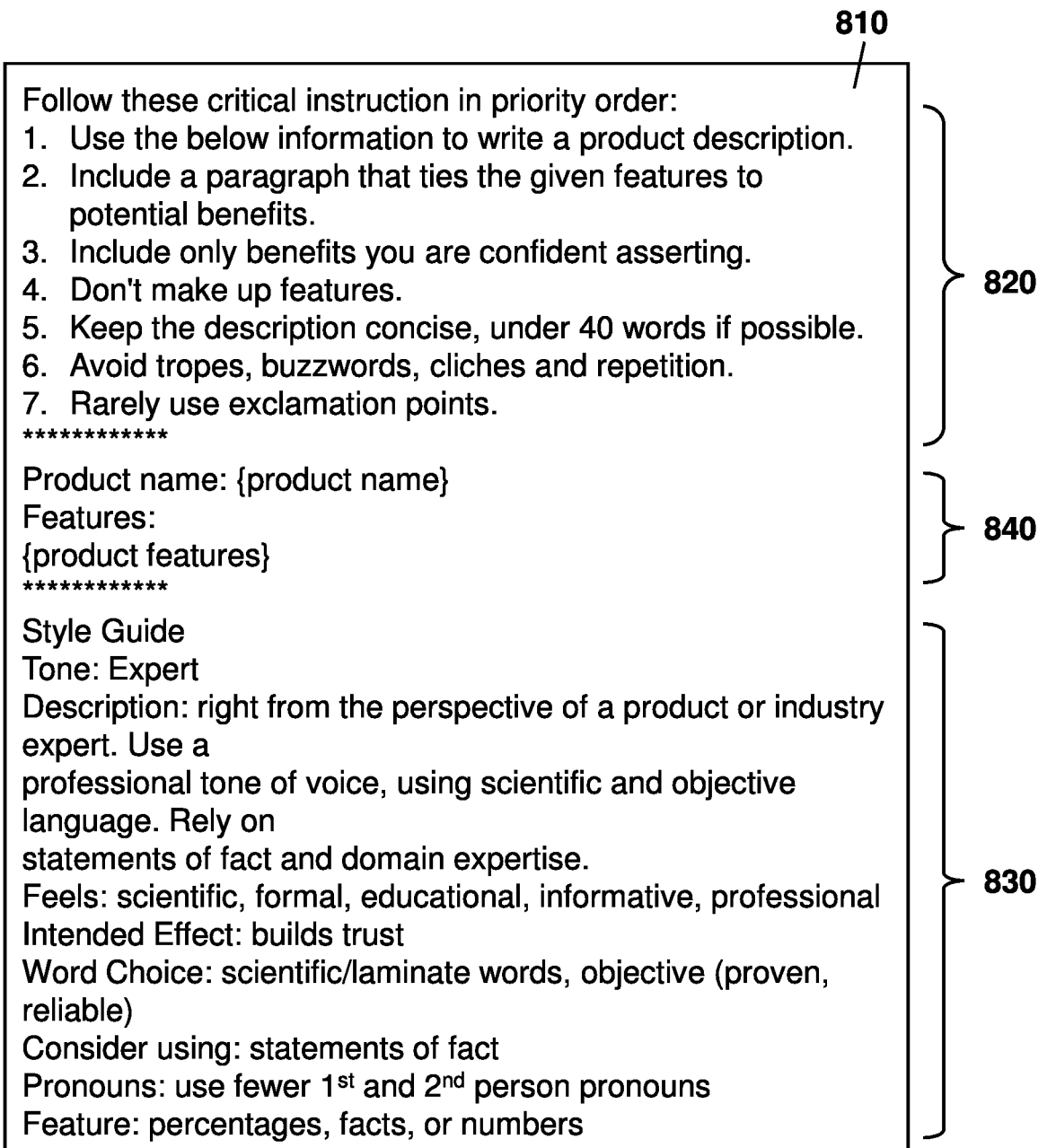

Follow these critical instruction in priority order:
1.  Use the below information to write a product description.
2.  Include a paragraph that ties the given features to potential benefits.
3.  Include only benefits you are confident asserting.
4.  Don't make up features.
5.  Keep the description concise, under 40 words if possible.
6.  Avoid tropes, buzzwords, cliches and repetition.
7.  Rarely use exclamation points.
************

820

Product name: {product name}
Features:
{product features}
************

840

Style Guide
Tone: Expert
Description: right from the perspective of a product or industry expert. Use a
professional tone of voice, using scientific and objective language. Rely on
statements of fact and domain expertise.
Feels: scientific, formal, educational, informative, professional
Intended Effect: builds trust
Word Choice: scientific/laminate words, objective (proven, reliable)
Consider using: statements of fact
Pronouns: use fewer 1$^{st}$ and 2$^{nd}$ person pronouns
Feature: percentages, facts, or numbers

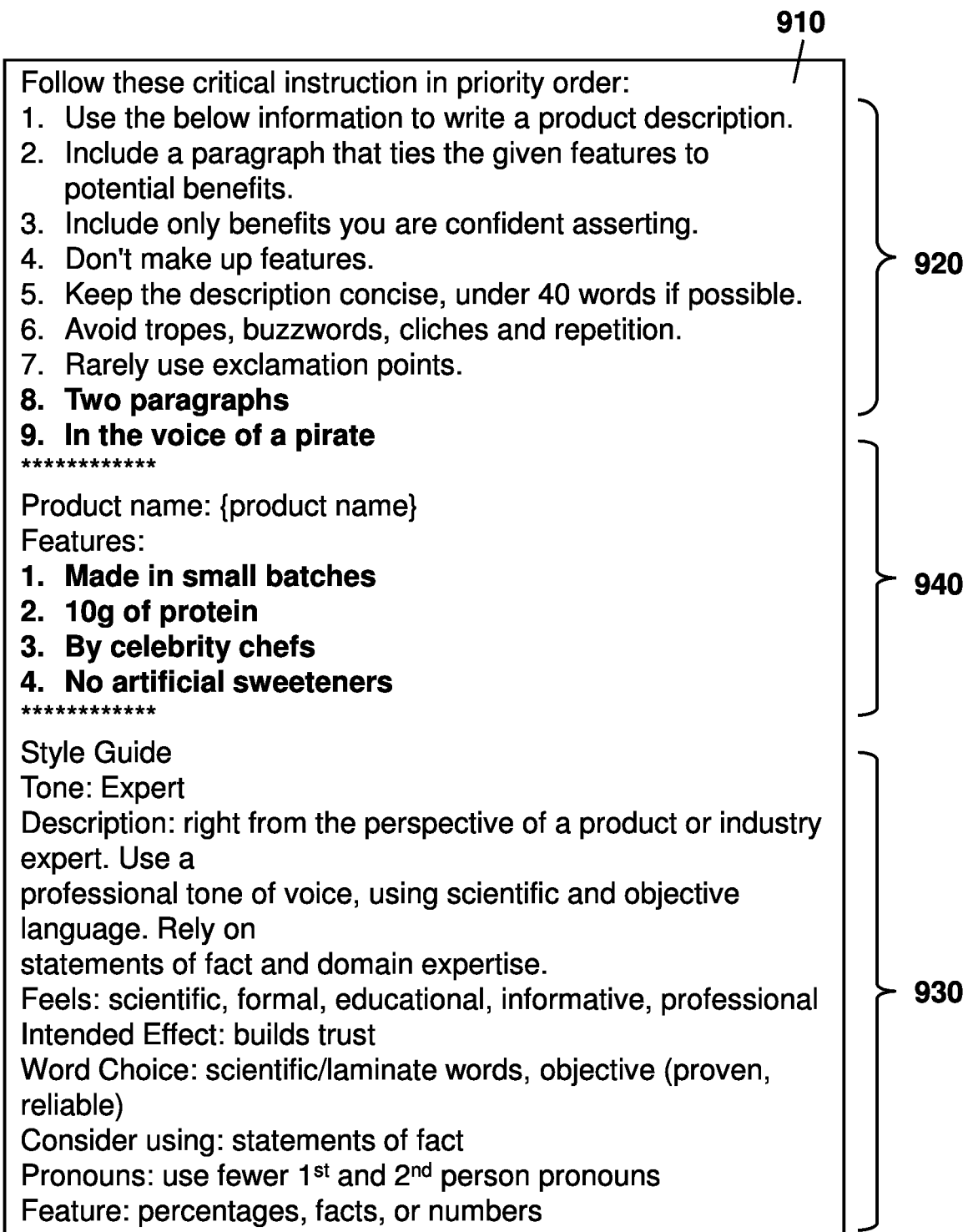

Follow these critical instruction in priority order:

1. Use the below information to write a product description.
2. Include a paragraph that ties the given features to potential benefits.
3. Include only benefits you are confident asserting.
4. Don't make up features.
5. Keep the description concise, under 40 words if possible.
6. Avoid tropes, buzzwords, cliches and repetition.
7. Rarely use exclamation points.
8. Two paragraphs
9. In the voice of a pirate

************

Product name: {product name}
Features:
1. Made in small batches
2. 10g of protein
3. By celebrity chefs
4. No artificial sweeteners

************

Style Guide
Tone: Expert
Description: right from the perspective of a product or industry expert. Use a
professional tone of voice, using scientific and objective language. Rely on
statements of fact and domain expertise.
Feels: scientific, formal, educational, informative, professional
Intended Effect: builds trust
Word Choice: scientific/laminate words, objective (proven, reliable)
Consider using: statements of fact
Pronouns: use fewer 1st and 2nd person pronouns
Feature: percentages, facts, or numbers

METHODS AND SYSTEMS FOR PARSING A MIX OF FEATURES AND INSTRUCTIONS INTO A PROMPT

FIELD OF THE DISCLOSURE

The present disclosure is related to Large Language Models (LLMs), and in particular relates to large language models with natural language processing (NLP).

BACKGROUND

Large Language Models are deep learning algorithms that can recognize inputs and predict and/or generate text and/or other content (e.g. based on the training the model has received, e.g., from large datasets). LLMs include, for example, generative pre-trained transformer models such as GPT-3.

Various parameters and inputs can be provided to the LLM to control the model's behavior and output. These include, for example, the prompt, temperature, maximum length of output, top-p, top-k and stop words, among others. Of these, the prompt serves as a guide for the LLM, providing a starting point from which it can generate a response.

SUMMARY

Getting a large language model, even one with an attached natural language processing module for understanding natural language instructions, to return consistently high quality text generations appropriate to a particular use case is surprisingly difficult. This is why the field of "prompt engineering" exists, the field being related to, among other things, the process of determining the most optimal ways to structure a request (prompt) of an LLM. The careful pre-construction of a prompt for a particular use case can be valuable in shaping the quality of the output generations resulting from that prompt's execution by an LLM. For example, there are many ways to construct a prompt for generating a blog post. These may include instructions such as "write a blog post", "write a blog post which would appeal to a technical reader", "write a blog post that can be read in under 2 minutes", to name a few of many possibilities.

For a prompt to be of practical use, it generally requires user input that must be gathered (e.g. in real-time) from an end user interacting with the system. This user input is typically required to specify data or features about what to generate. For example, the instruction may be to "Write a blog post about how to import a JSON file in React".

While pre-constructed prompts can be important to simplify the end-user experience of interacting with an LLM and/or to improve the quality of its end results, pre-constructed prompts may not capture all of the desired output criteria of a particular end-user. For example, one user may wish to write a blog post that can be read in under two minutes, another prefers longer blog posts that have no length preference, and a third may wish to write product descriptions with inline citations to various sources. For example, scientific citations may be irrelevant to most merchants, but for some selling specific products this may be important.

Providing all possible options for custom user preferences in a user interface (UI) to insert into a corresponding pre-constructed prompt is not necessarily feasible and/or desirable. Therefore, in accordance with embodiments of the present disclosure, methods and systems are provided to collect instructions from the end user to send directly to the LLM as part of the prompt.

In one aspect, a computer-implemented method may be provided. The method may include receiving text input, the text input including feature inputs and prompt instructions, and analyzing the text input to identify the feature inputs and the prompt instructions. The method may further comprise generating a prompt to be provided to an LLM based on a prompt template, the feature inputs, and the prompt instructions.

In some embodiments, the prompt instructions may be delineated by one or more tags, and wherein analyzing the text input to identify the feature inputs and the prompt instructions includes parsing the text input to identify the prompt instructions based on the one or more tags.

In some embodiments, more than one form of the one or more tags may be used to delineate the prompt instructions.

In some embodiments the one or more tags may include at least one of a start delimiter to delimit the start of a given prompt instruction and an end delimiter to delimit the end of a given prompt instruction.

In some embodiments, at least one of a start delimiter and an end delimiter may comprise a start delimiter, and the start delimiter includes a slash-character.

In some embodiments, at least one of a start delimiter and an end delimiter may comprise an end delimiter, and the end delimiter includes at least one of a carriage return and a line feed.

In some embodiments, the text input may be received via a graphical user interface.

In some embodiments, the text input may be received via a text input control of the graphical user interface.

In some embodiments the graphical user interface may format at least one of tags and prompt instructions differently from feature inputs and/or use one or more colours different from colours used to present feature inputs.

In some embodiments, the prompt template may correspond to a pre-constructed prompt.

In some embodiments, the prompt template may include one or more sections for providing one or more of the feature inputs and the prompt instructions, and wherein generating the prompt may include inserting the one or more of the feature inputs and the prompt instructions into corresponding ones of the one or more sections.

In some embodiments the prompt template may not include a section for providing prompt instructions and wherein generating the prompt includes populating the prompt template with the feature inputs and concatenating the populated prompt template with the prompt instructions to form the prompt.

In some embodiments, in the prompt the populated prompt template and the prompt instructions may be separated by a distinct sequence of symbols and/or whitespace.

In some embodiments, generating the prompt to be provided to the LLM may comprise using a prompt generator.

In some embodiments, the method may further comprise providing the generated prompt to the LLM.

In some embodiments, method may further comprise receiving a response to the generated prompt from the LLM.

In some embodiments, method may further comprise presenting some or all of the response to the generated prompt via a graphical user interface.

In a further aspect, a computer system comprising one or more processors and a computer readable medium storing instructions. The instructions, when executed by at least one of the one or more processors, may cause the computer system to receive text input, the text input including feature inputs and prompt instructions and analyze the text input to identify the feature inputs and the prompt instructions. The instructions, when executed by at least one of the one or more processors, may further cause the computer system to generate a prompt to be provided to an LLM based on a prompt template, the feature inputs, and the prompt instructions.

In some embodiments, the computer readable medium may be a memory.

In a further aspect, a non-transitory computer readable storage medium may be provided. The computer readable storage medium may store instructions that, when executed by at least one processor of a computer system, may cause the computer system to receive text input, the text input including feature inputs and prompt instructions and analyze the text input to identify the feature inputs and the prompt instructions. The computer readable storage medium may further store instructions that, when executed by at least one processor of a computer system, may cause the computer system to generate a prompt to be provided to an LLM based on a prompt template, the feature inputs, and the prompt instructions.

BRIEF DESCRIPTION OF THE DRAWINGS

The present disclosure will be better understood with reference to the drawings, in which:

FIG. 8 is a block diagram showing an example prompt template.

FIG. 9 is a block diagram showing an example prompt generated from a text field and a prompt template.

DETAILED DESCRIPTION

Figure 1A:
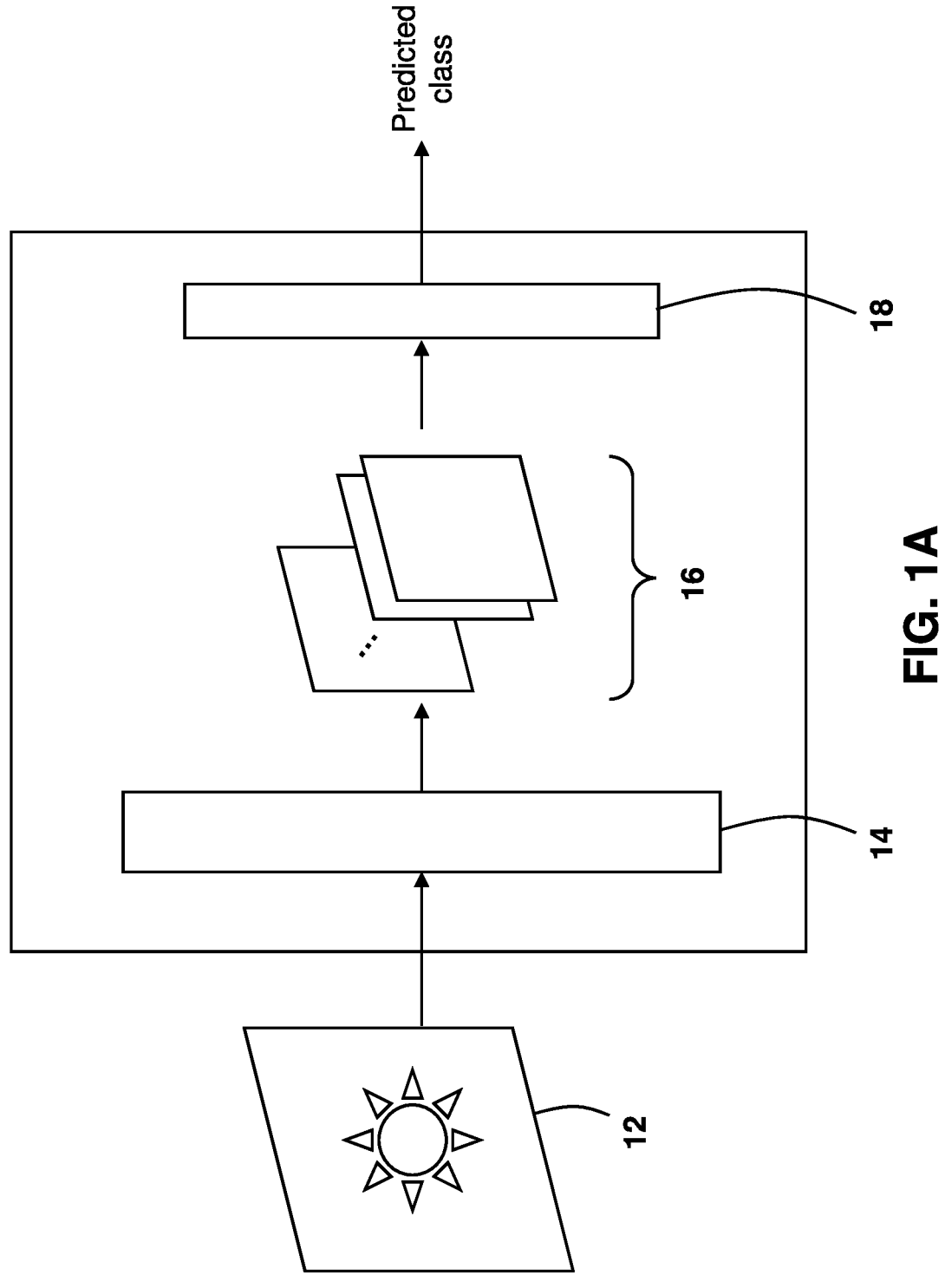
FIG. 1A is a block diagram of a simplified convolutional neural network, which may be used in examples of the present disclosure.

The present disclosure will now be described in detail by describing various illustrative, non-limiting embodiments thereof with reference to the accompanying drawings and exhibits. The disclosure may, however, be embodied in many different forms and should not be construed as being limited to the illustrative embodiments set forth herein. Rather, the embodiments are provided so that this disclosure will be thorough and will fully convey the concept of the disclosure to those skilled in the art.

In accordance with various embodiments of the present disclosure, methods and systems are provided to create prompts for LLMs.

In one aspect, a computer system such as an e-commerce platform, may require that vendors add product descriptions to products being added to their electronic storefront. This may be a time consuming task for the vendors, there may be best practices the vendor is not aware of, and/or the vendor may be an inexperienced writer, and in one or more of these regards, an LLM may be used to assist in the creation of such descriptions. A property constructed prompt for such a system could assist in the generation of a product description of better quality (e.g. one that is more acceptable to the vendor, that results in more sales, and/or that results in fewer subsequent edits by the vendor). However, the use of the methods and systems for generating product descriptions in an e-commerce platform is merely provided for illustration, and the embodiments of the present disclosure could be used for other purposes in order to generate high quality text.

Therefore, on, e.g., a user interface in which a form gathers data, the present embodiments provide for a solution in which the system may gather a mixture of feature inputs and prompt instructions from the user within the same input field (or adjacent input fields for, e.g., contemporaneous submission). The system may then parse the contents of the input field(s) to distinguish between the two types of input and inject each type, or text based on the inputs of each type, into an appropriate section within a pre-constructed prompt template.

Machine Learning and Computing Device

To assist in understanding the present disclosure, some concepts relevant to neural networks and machine learning (ML) are first discussed.

Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which need not be discussed in detail here.

A deep neural network (DNN) is a type of neural network having multiple layers and/or a large number of neurons. The term DNN may encompass any neural network having multiple layers, including convolutional neural networks (CNNs), recurrent neural networks (RNNs), and multilayer perceptrons (MLPs), among others.

DNNs are often used as ML-based models for modeling complex behaviors (e.g., human language, image recognition, object classification, etc.) in order to improve accuracy of outputs (e.g., more accurate predictions) such as, for example, as compared with models with fewer layers. In the present disclosure, the term "ML-based model" or more simply "ML model" may be understood to refer to a DNN. Training a ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model. For example, to train a ML model that is intended to model human language (also referred to as a language model), the training dataset may be a collection of text documents, referred to as a text corpus (or simply referred to as a corpus). The corpus may represent a language domain (e.g., a single language), a subject domain (e.g., scientific papers), and/or may encompass another domain or domains, be they larger or smaller than a single language or subject domain. For example, a relatively large, multilingual and non-subject-specific corpus may be created by extracting text from online webpages and/or publicly available social media posts. In another example, to train a ML model that is intended to classify images, the training dataset may be a collection of images. Training data may be annotated with ground truth labels (e.g. each data entry in the training dataset may be paired with a label), or may be unlabeled.

Training a ML model generally involves inputting into an ML model (e.g. an untrained ML model) training data to be processed by the ML model, processing the training data using the ML model, collecting the output generated by the ML model (e.g. based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or may be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data may be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters may be determined based on the measured performance of one or more of the trained ML models, and the first step of training (i.e., with the training set) may begin again on a different ML model described by the new set of determined hyperparameters. In this way, these steps may be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training a ML model. Backpropagation is used to adjust (also referred to as update) the value of the parameters in the ML model, with the goal of optimizing the objective function. For example, a defined loss function is calculated by forward propagation of an input to obtain an output of the ML model and comparison of the output value with the target value. Backpropagation calculates a gradient of the loss function with respect to the parameters of the ML model, and a gradient algorithm (e.g., gradient descent) is used to update (i.e., "learn") the parameters to reduce the loss function. Backpropagation is performed iteratively, so that the loss function is converged or minimized. Other techniques for learning the parameters of the ML model may be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters may then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of a ML model typically involves further training the ML model on a number of data samples (which may be smaller in number/cardinality than those used to train the model initially) that closely target the specific task. For example, a ML model for generating natural language that has been trained generically on publically-available text corpuses may be, e.g., fine-tuned by further training using the complete works of Shakespeare as training data samples (e.g., where the intended use of the ML model is generating a scene of a play or other textual content in the style of Shakespeare).

FIG. 1A is a simplified diagram of an example CNN 10, which is an example of a DNN that is commonly used for image processing tasks such as image classification, image analysis, object segmentation, etc. An input to the CNN 10 may be a 2D RGB image 12.

The CNN 10 includes a plurality of layers that process the image 12 in order to generate an output, such as a predicted classification or predicted label for the image 12. For simplicity, only a few layers of the CNN 10 are illustrated including at least one convolutional layer 14. The convolutional layer 14 performs convolution processing, which may involve computing a dot product between the input to the convolutional layer 14 and a convolution kernel. A convolutional kernel is typically a 2D matrix of learned parameters that is applied to the input in order to extract image features. Different convolutional kernels may be applied to extract different image information, such as shape information, color information, etc.

The output of the convolution layer 14 is a set of feature maps 16 (sometimes referred to as activation maps). Each feature map 16 generally has smaller width and height than the image 12. The set of feature maps 16 encode image features that may be processed by subsequent layers of the CNN 10, depending on the design and intended task for the CNN 10. In this example, a fully connected layer 18 processes the set of feature maps 16 in order to perform a classification of the image, based on the features encoded in the set of feature maps 16. The fully connected layer 18 contains learned parameters that, when applied to the set of feature maps 16, outputs a set of probabilities representing the likelihood that the image 12 belongs to each of a defined set of possible classes. The class having the highest probability may then be outputted as the predicted classification for the image 12.

In general, a CNN may have different numbers and different types of layers, such as multiple convolution layers, max-pooling layers and/or a fully connected layer, among others. The parameters of the CNN may be learned through training, using data having ground truth labels specific to the desired task (e.g., class labels if the CNN is being trained for a classification task, pixel masks if the CNN is being trained for a segmentation task, text annotations if the CNN is being trained for a captioning task, etc.), as discussed above.

Some concepts in ML-based language models are now discussed. It may be noted that, while the term "language model" has been commonly used to refer to a ML-based language model, there could exist non-ML language models. In the present disclosure, the term "language model" may be used as shorthand for ML-based language model (i.e., a language model that is implemented using a neural network or other ML architecture), unless stated otherwise. For example, unless stated otherwise, "language model" encompasses LLMs.

A language model may use a neural network (typically a DNN) to perform natural language processing (NLP) tasks such as language translation, image captioning, grammatical error correction, and language generation, among others. A language model may be trained to model how words relate to each other in a textual sequence, based on probabilities. A language model may contain hundreds of thousands of learned parameters or in the case of a large language model (LLM) may contain millions or billions of learned parameters or more.

In recent years, there has been interest in a type of neural network architecture, referred to as a transformer, for use as language models. For example, the Bidirectional Encoder Representations from Transformers (BERT) model, the Transformer-XL model and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as recurrent neural network (RNN)-based language models.

Figure 1B:
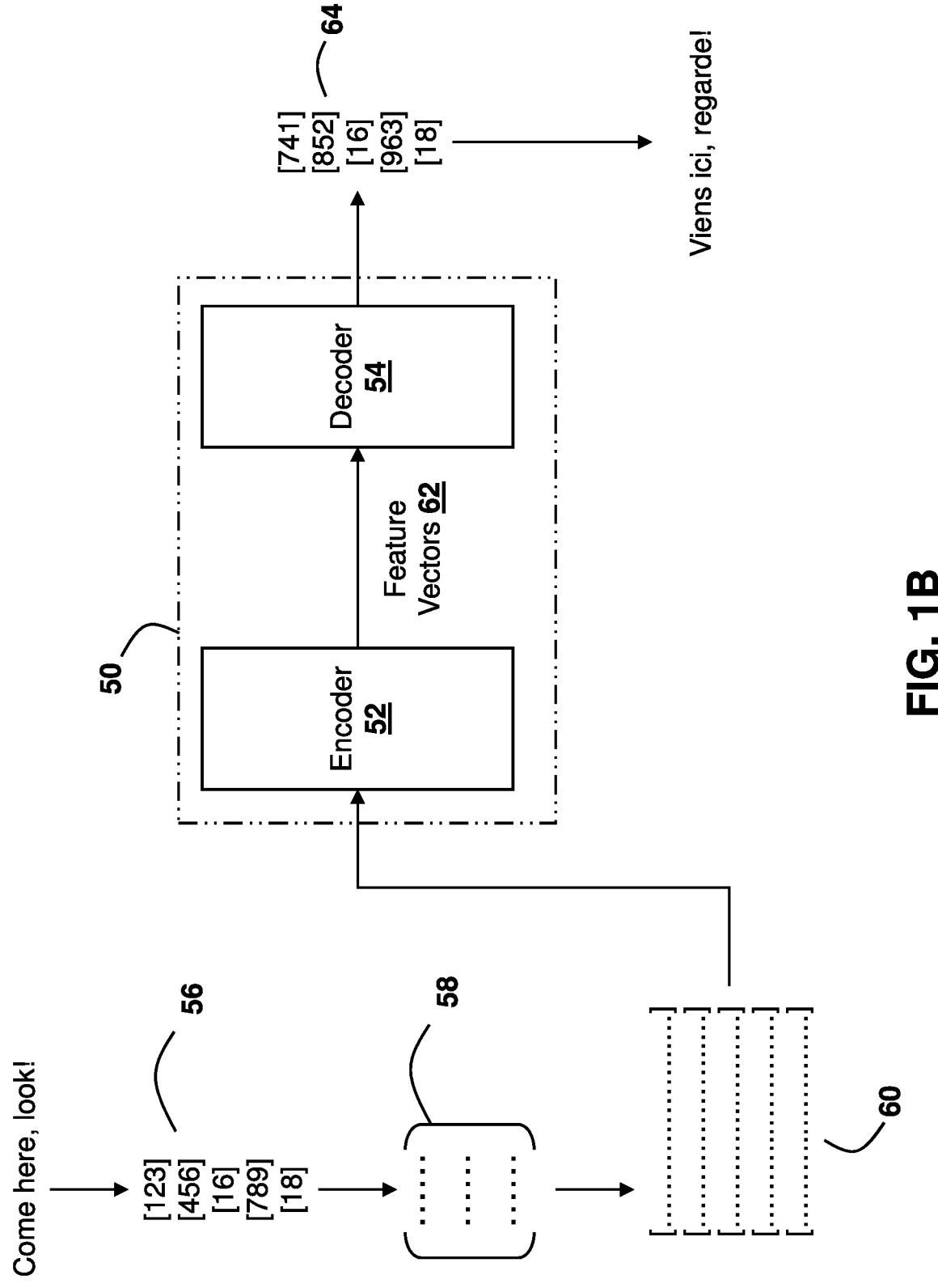
FIG. 1B is a block diagram of a simplified transformer neural network, which may be used in examples of the present disclosure.

FIG. 1B is a simplified diagram of an example transformer 50, and a simplified discussion of its operation is now provided. The transformer 50 includes an encoder 52 (which may comprise one or more encoder layers/blocks connected in series) and a decoder 54 (which may comprise one or more decoder layers/blocks connected in series). Generally, the encoder 52 and the decoder 54 each include a plurality of neural network layers, at least one of which may be a self-attention layer. The parameters of the neural network layers may be referred to as the parameters of the language model.

The transformer 50 may be trained on a text corpus that is labelled (e.g., annotated to indicate verbs, nouns, etc.) or unlabelled. LLMs may be trained on a large unlabelled corpus. Some LLMs may be trained on a large multi-language, multi-domain corpus, to enable the model to be versatile at a variety of language-based tasks such as generative tasks (e.g., generating human-like natural language responses to natural language input).

An example of how the transformer 50 may process textual input data is now described. Input to a language model (whether transformer-based or otherwise) typically is in the form of natural language as may be parsed into tokens. It should be appreciated that the term "token" in the context of language models and NLP has a different meaning from the use of the same term in other contexts such as data security. Tokenization, in the context of language models and NLP, refers to the process of parsing textual input (e.g., a character, a word, a phrase, a sentence, a paragraph, etc.) into a sequence of shorter segments that are converted to numerical representations referred to as tokens (or "compute tokens"). Typically, a token may be an integer that corresponds to the index of a text segment (e.g., a word) in a vocabulary dataset. Often, the vocabulary dataset is arranged by frequency of use. Commonly occurring text, such as punctuation, may have a lower vocabulary index in the dataset and thus be represented by a token having a smaller integer value than less commonly occurring text. Tokens frequently correspond to words, with or without whitespace appended. In some examples, a token may correspond to a portion of a word. For example, the word "lower" may be represented by a token for [low] and a second token for [er]. In another example, the text sequence "Come here, look!" may be parsed into the segments [Come], [here], [,], [look] and [!], each of which may be represented by a respective numerical token. In addition to tokens that are parsed from the textual sequence (e.g., tokens that correspond to words and punctuation), there may also be special tokens to encode non-textual information. For example, a [CLASS] token may be a special token that corresponds to a classification of the textual sequence (e.g., may classify the textual sequence as a poem, a list, a paragraph, etc.), a [EOT] token may be another special token that indicates the end of the textual sequence, other tokens may provide formatting information, etc.

In FIG. 1B, a short sequence of tokens 56 corresponding to the text sequence "Come here, look!" is illustrated as input to the transformer 50. Tokenization of the text sequence into the tokens 56 may be performed by some pre-processing tokenization module such as, for example, a byte pair encoding tokenizer (the "pre" referring to the tokenization occurring prior to the processing of the tokenized input by the LLM), which is not shown in FIG. 1B for simplicity. In general, the token sequence that is inputted to the transformer 50 may be of any length up to a maximum length defined based on the dimensions of the transformer 50 (e.g., such a limit may be 2048 tokens in some LLMs). Each token 56 in the token sequence is converted into an embedding vector 60 (also referred to simply as an embedding). An embedding 60 is a learned numerical representation (such as, for example, a vector) of a token that captures some semantic meaning of the text segment represented by the token 56. The embedding 60 represents the text segment corresponding to the token 56 in a way such that embeddings corresponding to semantically-related text are closer to each other in a vector space than embeddings corresponding to semantically-unrelated text. For example, assuming that the words "look", "see", and "cake" each correspond to, respectively, a "look" token, a "see" token, and a "cake" token when tokenized, the embedding 60 corresponding to the "look" token will be closer to another embedding corresponding to the "see" token in the vector space, as compared to the distance between the embedding 60 corresponding to the "look" token and another embedding corresponding to the "cake" token. The vector space may be defined by the dimensions and values of the embedding vectors. Various techniques may be used to convert a token 56 to an embedding 60. For example, another trained ML model may be used to convert the token 56 into an embedding 60. In particular, another trained ML model may be used to convert the token 56 into an embedding 60 in a way that encodes additional information into the embedding 60 (e.g., a trained ML model may encode positional information about the position of the token 56 in the text sequence into the embedding 60). In some examples, the numerical value of the token 56 may be used to look up the corresponding embedding in an embedding matrix 58 (which may be learned during training of the transformer 50).

The generated embeddings 60 are input into the encoder 52. The encoder 52 serves to encode the embeddings 60 into feature vectors 62 that represent the latent features of the embeddings 60. The encoder 52 may encode positional information (i.e., information about the sequence of the input) in the feature vectors 62. The feature vectors 62 may have very high dimensionality (e.g., on the order of thousands or tens of thousands), with each element in a feature vector 62 corresponding to a respective feature. The numerical weight of each element in a feature vector 62 represents the importance of the corresponding feature. The space of all possible feature vectors 62 that can be generated by the encoder 52 may be referred to as the latent space or feature space.

Conceptually, the decoder 54 is designed to map the features represented by the feature vectors 62 into meaningful output, which may depend on the task that was assigned to the transformer 50. For example, if the transformer 50 is used for a translation task, the decoder 54 may map the feature vectors 62 into text output in a target language different from the language of the original tokens 56. Generally, in a generative language model, the decoder 54 serves to decode the feature vectors 62 into a sequence of tokens. The decoder 54 may generate output tokens 64 one by one. Each output token 64 may be fed back as input to the decoder 54 in order to generate the next output token 64. By feeding back the generated output and applying self-attention, the decoder 54 is able to generate a sequence of output tokens 64 that has sequential meaning (e.g., the resulting output text sequence is understandable as a sentence and obeys grammatical rules). The decoder 54 may generate output tokens 64 until a special [EOT] token (indicating the end of the text) is generated. The resulting sequence of output tokens 64 may then be converted to a text sequence in post-processing. For example, each output token 64 may be an integer number that corresponds to a vocabulary index. By looking up the text segment using the vocabulary index, the text segment corresponding to each output token 64 can be retrieved, the text segments can be concatenated together and the final output text sequence (in this example, "Viens ici, regarde!") can be obtained.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that may be considered to be an encoder-only language model. A decoder-only language model accepts embeddings as input and may use auto-regression to generate an output text sequence. Transformer-XL and GPT-type models may be language models that are considered to be decoder-only language models.

Because GPT-type language models tend to have a large number of parameters, these language models may be considered LLMs. An example GPT-type LLM is GPT-3. GPT-3 is a type of GPT language model that has been trained (in an unsupervised manner) on a large corpus derived from documents available to the public online. GPT-3 has a very large number of learned parameters (on the order of hundreds of billions), is able to accept a large number of tokens as input (e.g., up to 2048 input tokens), and is able to generate a large number of tokens as output (e.g., up to 2048 tokens). GPT-3 has been trained as a generative model, meaning that it can process input text sequences to predictively generate a meaningful output text sequence. ChatGPT is built on top of a GPT-type LLM, and has been fine-tuned with training datasets based on text-based chats (e.g., chatbot conversations). ChatGPT is designed for processing natural language, receiving chat-like inputs and generating chat-like outputs.

A computing system may access a remote language model (e.g., a cloud-based language model), such as ChatGPT or GPT-3, via a software interface (e.g., an application programming interface (API)). Additionally or alternatively, such a remote language model may be accessed via a network such as, for example, the Internet. In some implementations such as, for example, potentially in the case of a cloud-based language model, a remote language model may be hosted by a computer system as may include a plurality of cooperating (e.g., cooperating via a network) computer systems such as may be in, for example, a distributed arrangement. Notably, a remote language model may employ a plurality of processors (e.g., hardware processors such as, for example, processors of cooperating computer systems). Indeed, processing of inputs by an LLM may be computationally expensive/may involve a large number of operations (e.g., many instructions may be executed/large data structures may be accessed from memory) and providing output in a required timeframe (e.g., real-time or near real-time) may require the use of a plurality of processors/cooperating computing devices as discussed above.

Inputs to an LLM may be referred to as a prompt, which is a natural language input that includes instructions to the LLM to generate a desired output. A computing system may generate a prompt that is provided as input to the LLM via its API. As described above, the prompt may optionally be processed or pre-processed into a token sequence prior to being provided as input to the LLM via its API. A prompt can include one or more examples of the desired output, which provides the LLM with additional information to enable the LLM to better generate output according to the desired output. Additionally or alternatively, the examples included in a prompt may provide inputs (e.g., example inputs) corresponding to/as may be expected to result in the desired outputs provided. A one-shot prompt refers to a prompt that includes one example, and a few-shot prompt refers to a prompt that includes multiple examples. A prompt that includes no examples may be referred to as a zero-shot prompt.

Figure 2:
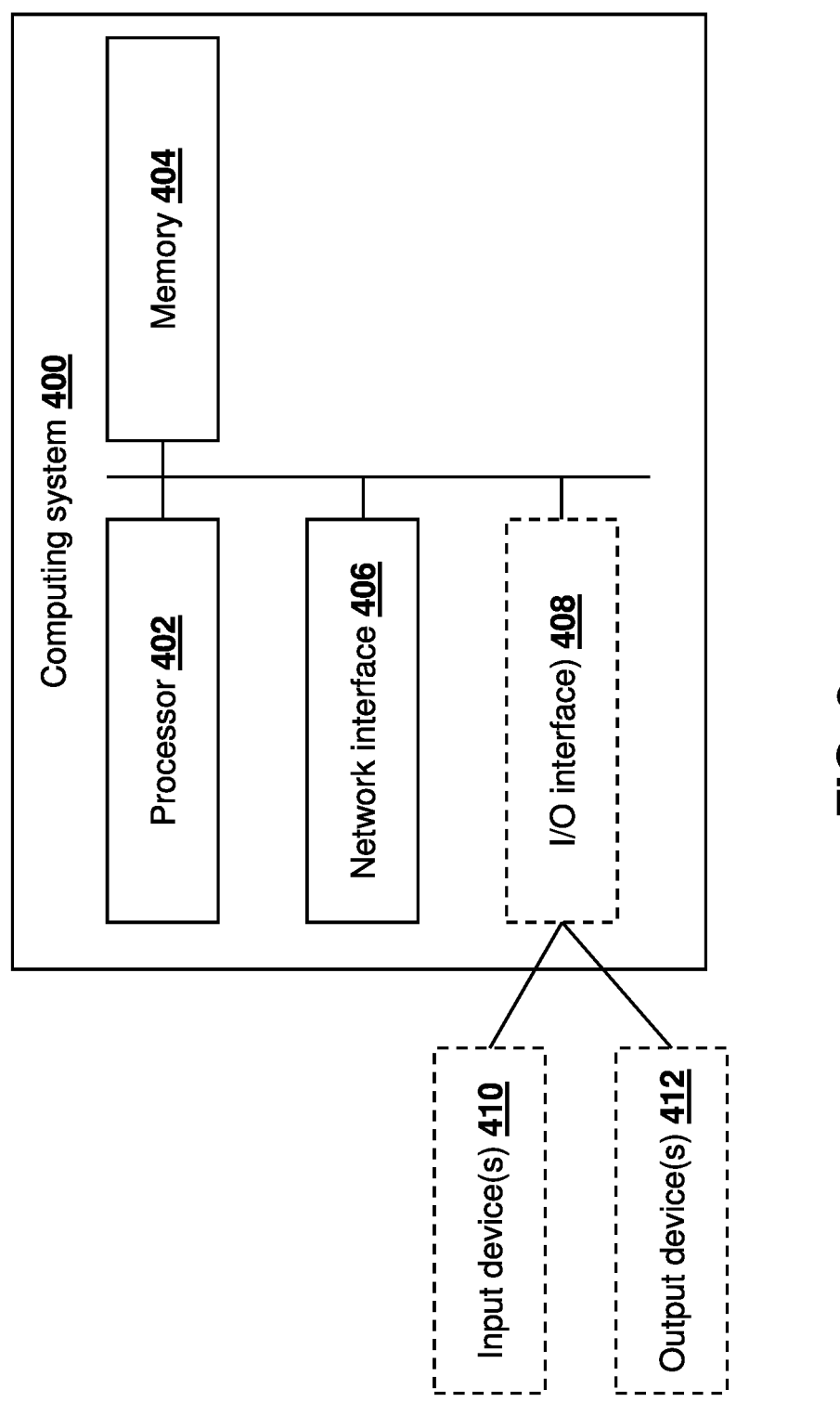
FIG. 2 is a block diagram of an example computing system, which may be used to implement examples of the present disclosure.

FIG. 2 illustrates an example computing system 400, which may be used to implement examples of the present disclosure, such as a prompt generation engine to generate prompts to be provided as input to a language model such as a LLM. Additionally or alternatively, one or more instances of the example computing system 400 may be employed to execute the LLM. For example, a plurality of instances of the example computing system 400 may cooperate to provide output using an LLM in manners as discussed above.

The example computing system 400 includes at least one processing unit, such as a processor 402, and at least one physical memory 404. The processor 402 may be, for example, a central processing unit, a microprocessor, a digital signal processor, an application-specific integrated circuit (ASIC), a field-programmable gate array (FPGA), a dedicated logic circuitry, a dedicated artificial intelligence processor unit, a graphics processing unit (GPU), a tensor processing unit (TPU), a neural processing unit (NPU), a hardware accelerator, or combinations thereof. The memory 404 may include a volatile or non-volatile memory (e.g., a flash memory, a random access memory (RAM), and/or a read-only memory (ROM)). The memory 404 may store instructions for execution by the processor 402, to the computing system 400 to carry out examples of the methods, functionalities, systems and modules disclosed herein.

The computing system 400 may also include at least one network interface 406 for wired and/or wireless communications with an external system and/or network (e.g., an intranet, the Internet, a P2P network, a WAN and/or a LAN). A network interface may enable the computing system 400 to carry out communications (e.g., wireless communications) with systems external to the computing system 400, such as a language model residing on a remote system.

The computing system 400 may optionally include at least one input/output (I/O) interface 408, which may interface with optional input device(s) 410 and/or optional output device(s) 412. Input device(s) 410 may include, for example, buttons, a microphone, a touchscreen, a keyboard, etc. Output device(s) 412 may include, for example, a display, a speaker, etc. In this example, optional input device(s) 410 and optional output device(s) 412 are shown external to the computing system 400. In other examples, one or more of the input device(s) 410 and/or output device(s) 412 may be an internal component of the computing system 400.

A computing system, such as the computing system 400 of FIG. 2, may access a remote system (e.g., a cloud-based system) to communicate with a remote language model or LLM hosted on the remote system such as, for example, using an application programming interface (API) call. The API call may include an API key to enable the computing system to be identified by the remote system. The API call may also include an identification of the language model or LLM to be accessed and/or parameters for adjusting outputs generated by the language model or LLM, such as, for example, one or more of a temperature parameter (which may control the amount of randomness or "creativity" of the generated output) (and/or, more generally some form of random seed as serves to introduce variability or variety into the output of the LLM), a minimum length of the output (e.g., a minimum of 10 tokens) and/or a maximum length of the output (e.g., a maximum of 1000 tokens), a frequency penalty parameter (e.g., a parameter which may lower the likelihood of subsequently outputting a word based on the number of times that word has already been output), a "best of" parameter (e.g., a parameter to control the number of times the model will use to generate output after being instructed to, e.g., produce several outputs based on slightly varied inputs). The prompt generated by the computing system is provided to the language model or LLM and the output (e.g., token sequence) generated by the language model or LLM is communicated back to the computing system. In other examples, the prompt may be provided directly to the language model or LLM without requiring an API call. For example, the prompt could be sent to a remote LLM via a network such as, for example, as or in message (e.g., in a payload of a message).

An Example e-Commerce Platform

Although integration with a commerce platform is not required, in some embodiments, the methods disclosed herein may be performed on or in association with a commerce platform such as an e-commerce platform. Therefore, an example of a commerce platform will be described.

Figure 3:
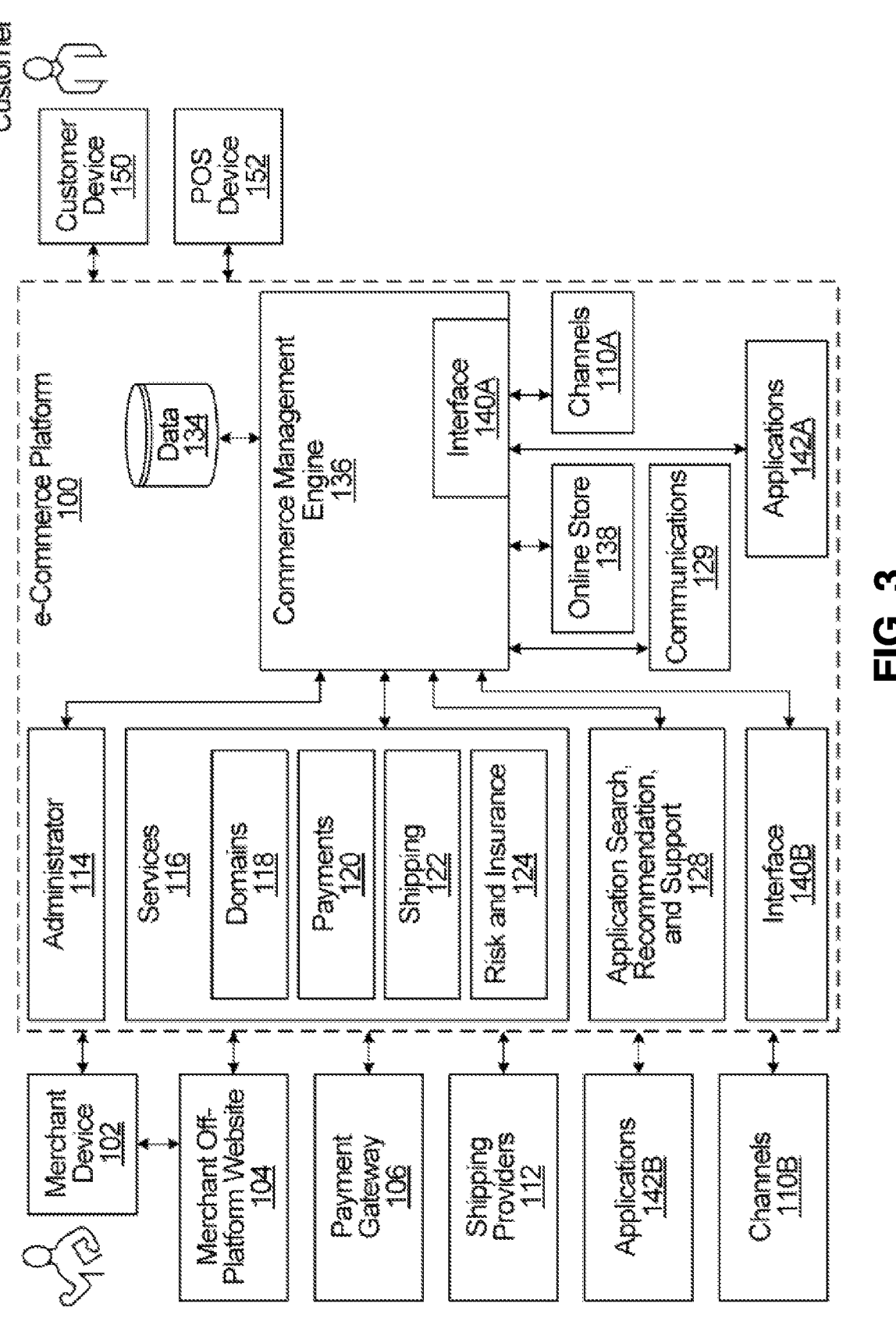
FIG. 3 is a block diagram showing an example e-commerce system capable of implementing the embodiments of the present disclosure.

FIG. 3 illustrates an example e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 3, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a non-transitory computer-readable medium. The memory may be and/or may include random access memory (RAM) and/or persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

Figure 4:
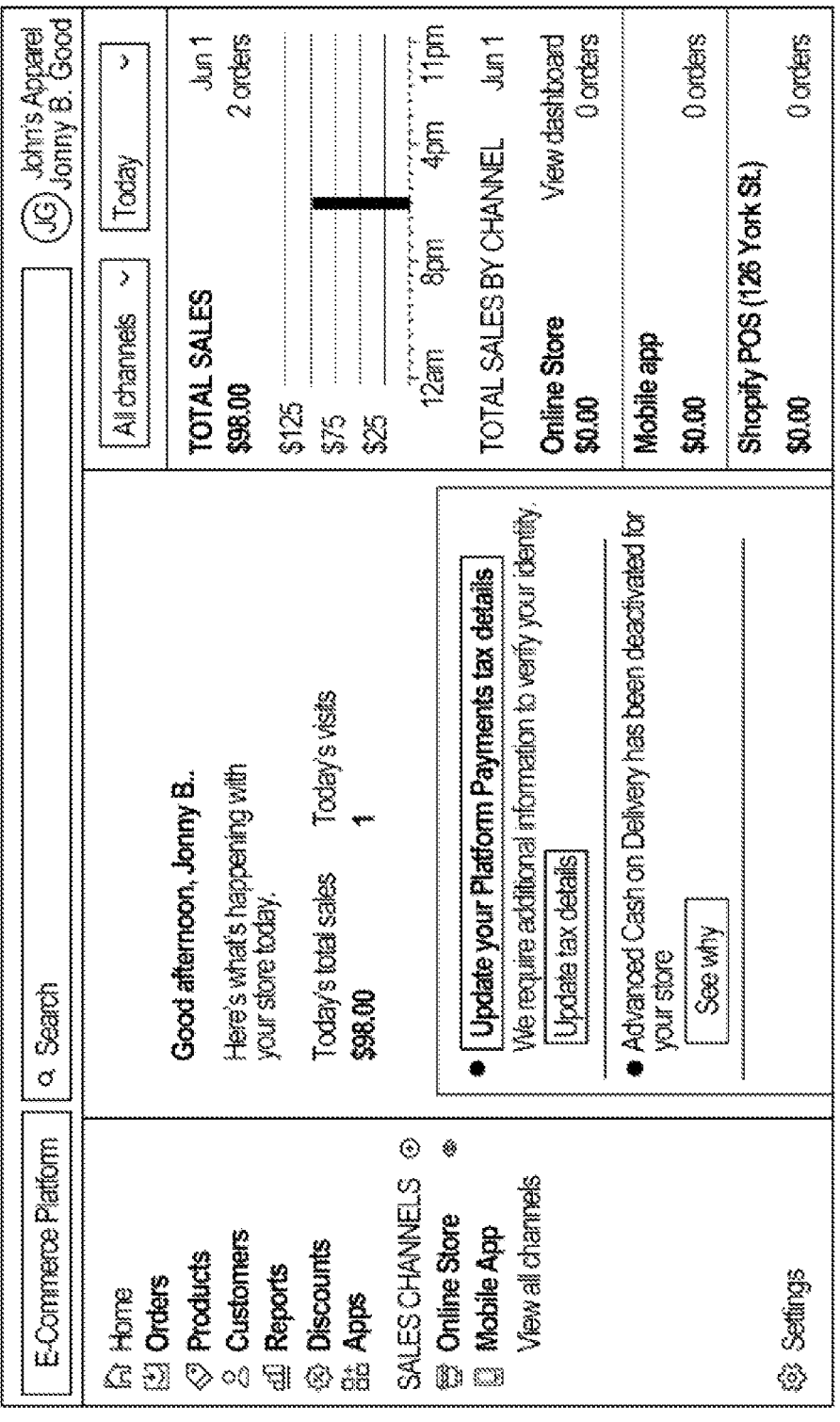
FIG. 4 is a block diagram showing an example interface for a merchant using the e-commerce platform of FIG. 3.

FIG. 4 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 4. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as, for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 3, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as, for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B. A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and may track quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Input Collection

In some embodiments of the present disclosure, an input field on a user interface may allow entry of text snippets. For example, in an e-commerce platform such as that described above with regard to FIG. 3, a merchant may need to describe products or services that are provided on the electronic storefront. However, other use cases are possible, and in general a user may wish to obtain text as a result of prompts. The text snippets may be or contain, for example, one or more strings of unformatted text. Additionally or alternatively, the text snippets may be or contain formatted (or "rich") text (i.e. conforming to a particular data format). Where the text snippets contain formatted text, the format may be such that the formatted text is convertible to one or more strings of unformatted text. The resultant strings of unformatted text may or may not include inline formatting elements (e.g. involving the use of a markup language).

Figure 5:
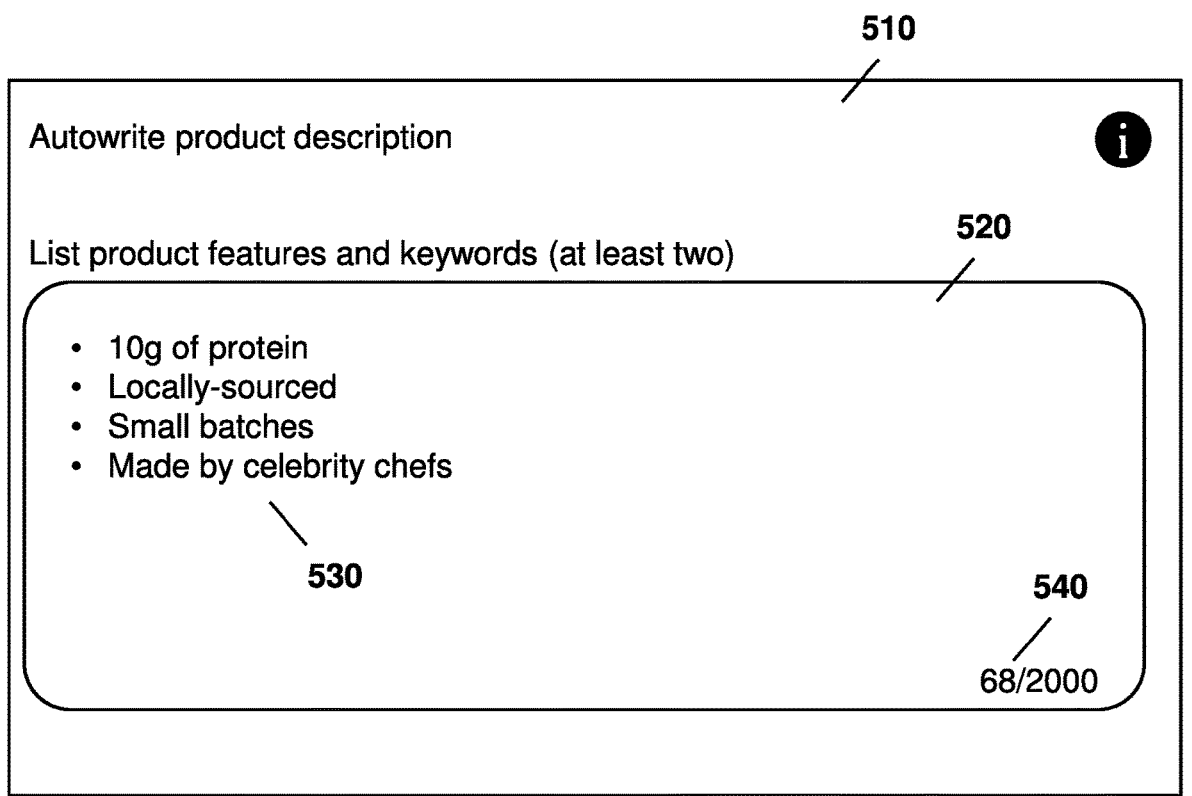
FIG. 5 is a block diagram showing an example user interface having a text input field.

For example, reference is now made to FIG. 5. In the embodiment of FIG. 5, a user interface 510 is provided. User interface 510 may be part of a web-based form, application, among other user interfaces.

A text entry area 520 may allow a user to input text snippets. For example, such text snippets may be a single word, a phrase or a sentence. The text entry area 520 may provide for these text snippets to be entered (e.g. as formatted or "rich" text, as unformatted text that includes inline formatting elements, as unformatted text, etc.) in a bullet-form list, a comma-separated list, paragraph form, or other style. In the example of FIG. 5, the text is shown in a bullet-form list 530.

The content of these "ordinary" or "plain" text snippets is considered by the system to be the set of feature inputs to a text generation platform. As used herein, a "text generation platform" or "text generation engine" may be any Large Language Model (LLM) capable of producing text based on feature inputs and prompt instructions, as described below.

In some cases, the text entry area 520 may have a maximum number of characters that can be input. For example, this may be based on limits for the LLM. Thus, a character count 540 is shown in the example of FIG. 5.

However, the embodiment of FIG. 5 does not provide for any instructions to the LLM on how to process the text snippets from list 530 and what type of output the LLM should provide.

Therefore, in accordance with embodiments of the present disclosure, the UI may provide some text snippets that may be optionally prefaced, enclosed, or otherwise distinguished by a particular symbol or set of symbols or formatting to indicate a second type of text. The content from the second type of text snippets are not intended to be treated as feature inputs to the text generation platform, but rather as prompt instructions to the text generation engine itself. As a simplified example, the feature inputs and prompt instructions may be both input (for example as a larger prompt) to the LLM, such as for example "Write a short product description for a product with the following features {features} and make sure to follow these instructions when writing: {instructions}.

Figure 6:
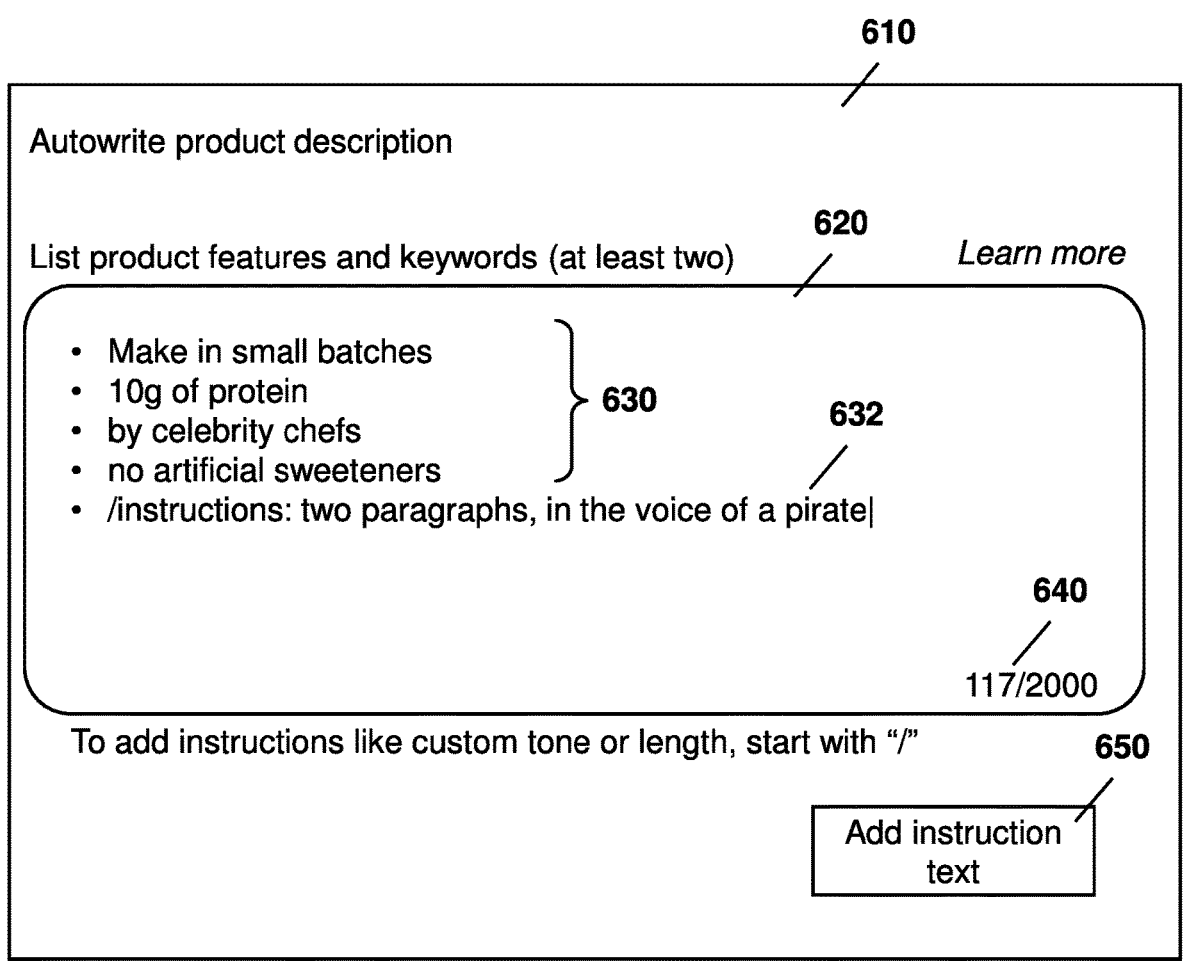
FIG. 6 is a block diagram showing an example user interface having a text input field in which instructions can be added to the text using tagged text snippets.

For example, reference is now made to FIG. 6. The embodiment of FIG. 6 shows an example user interface 610 having a text input area 620. Within text input area 620, text snippets for a first type of input 630 may be provided which are intended for the subject matter of the output from the text generation platform. Again, the content of these "ordinary" or "plain" text snippets for the first type of input 630 is considered by the system to be the set of feature inputs to a text generation platform.

However, in the embodiment of FIG. 6, a second type of input 632 is also provided. As indicated above, the content from the second type of text snippets is not intended to be treated as a feature input to the text generation platform, but rather as prompt instructions to the text generation engine itself.

The second type of input 632 may be prefaced or formatted with symbols to distinguish and/or delineate the second type of input (prompt instructions) from the first type of input (feature inputs). The particular formatting or symbols that serve to distinguish the second type of text may vary, and the present disclosure is not limited to any particular type of formatting or symbols. Such formatting or symbols may be referred to as "tags" or "tagging".

Examples of tagging prompt instructions may include, but are not limited to:

a. Prefacing a line with "/prompt"; e.g. "/prompt: text snippet";

b. Prefacing a line with "/instructions"; e.g. "/instructions: text snippet";

c. Enclosing a text snippet in square brackets; e.g. "[text snippet]"

d. Enclosing a text snippet in curly braces; e.g. "{text snippet}"

e. Formatting a text snippet with italic; e.g. "text snippet"

f. etc.

In each of the above, an end delimiter may be used to indicate the end of an instruction. For example, in some cases the end delimiter may be a carriage return or a new line symbol. In some cases, for example when using square brackets or curly braces, the end delimiter may be the closing bracket or brace.

In some cases, the end delimiter may be the end of input in a text input area. For example, if a line starts with a tag and has no further carriage return or line ending within the text input field, this may indicate an end delimiter.

The second type of text may further be part of the character count 640 as seen in FIG. 6. As will be appreciated by those skilled in the art, the maximum number of characters allowed may be less than the maximum number of characters that can be input into the text generation platform to allow for prompt templates to be used. Specifically, the text from text input area 620 may be combined with text from a prompt template, as described below, and thus the maximum number of characters allowed for text input area 620 may be determined based on the expected size of the prompt template in some cases.

In some embodiments, the UI may provide one or more forms of assistance to a user in filling out the full tag for the user. For example, the user may type a forward slash "/" and the UI will automatically complete the full tag of "/instructions:" Other assistance in entering the tags is also possible.

In some cases, the user may click a button to indicate they wish to provide a snippet of the second type of text, and the tag may in response be automatically inserted at the cursor position. Thus, for example, a button 650 may be part of the user interface 610. Upon clicking button 650, the next line in text input area 620 may be populated with "/instruction:" to allow the user to start typing instructions.

However, button 650 is optional, and in some cases no button 650 is provided.

In some embodiments, user interface 610 may automatically color or otherwise format the tag in the textbox differently from the text snippets for the first type of input 630. For example, the tag may be highlighted, shown in a different text color than text snippets for the first type of input 630, or both. In some cases, only the tag may be colored differently. In some cases, the entire second type of input 632 may be colored differently.

In some embodiments, UI 610 may allow for multiple tags to serve the same purpose of distinguishing prompt instructions from feature inputs. For example, both "/instructions:" and "/prompt:" may be used with text snippets that are meant as prompt instructions, thereby creating the second type of text input 632. Additionally or alternatively, different tags may be treated differently when processed; that is, different tags may correspond to different kinds of prompt instructions. For example, the UI may allow for the use of '/instructions', '/length', '/language', etc.

In some embodiments, the text snippet accompanying a tag may be a single snippet. In some cases, the text snippet accompanying a tag may include multiple snippets. For example, these text snippets may be presented as a comma separated list, among other options. As illustrated in FIG. 6, the text snippet for the second type of text 632 provides a comma between the two separate instructions, namely that the output should be in two paragraphs and that the output should be in the voice of a pirate.

In some cases, multiple tags can be used in the input to indicate multiple prompt instructions. For example, the text in text input area 620 in FIG. 6 could be rewritten as:

Made in small batches 10 g of protein

By celebrity chefs

No artificial sweeteners

/instructions: two paragraphs

/instructions: in the voice of a pirate

Thus the instructions can be broken out into separate lines.

In some cases, multiple prompt instruction tags and/or multiple text snippets per prompt can be used. This may allow a user to format the text snippets for the first type of input 630 (feature inputs) and the text snippets for the second type of input 632 (prompt instructions) in a way that is clear to the user.

A user may enter any natural language as a text snippet, either for the feature inputs for the first type of input 630 or the prompt instructions for the second type of input 632.

The above inputs may be used to generate a prompt to receive information from a text generation platform. In particular, reference is now made to FIG. 7.

Figure 7:
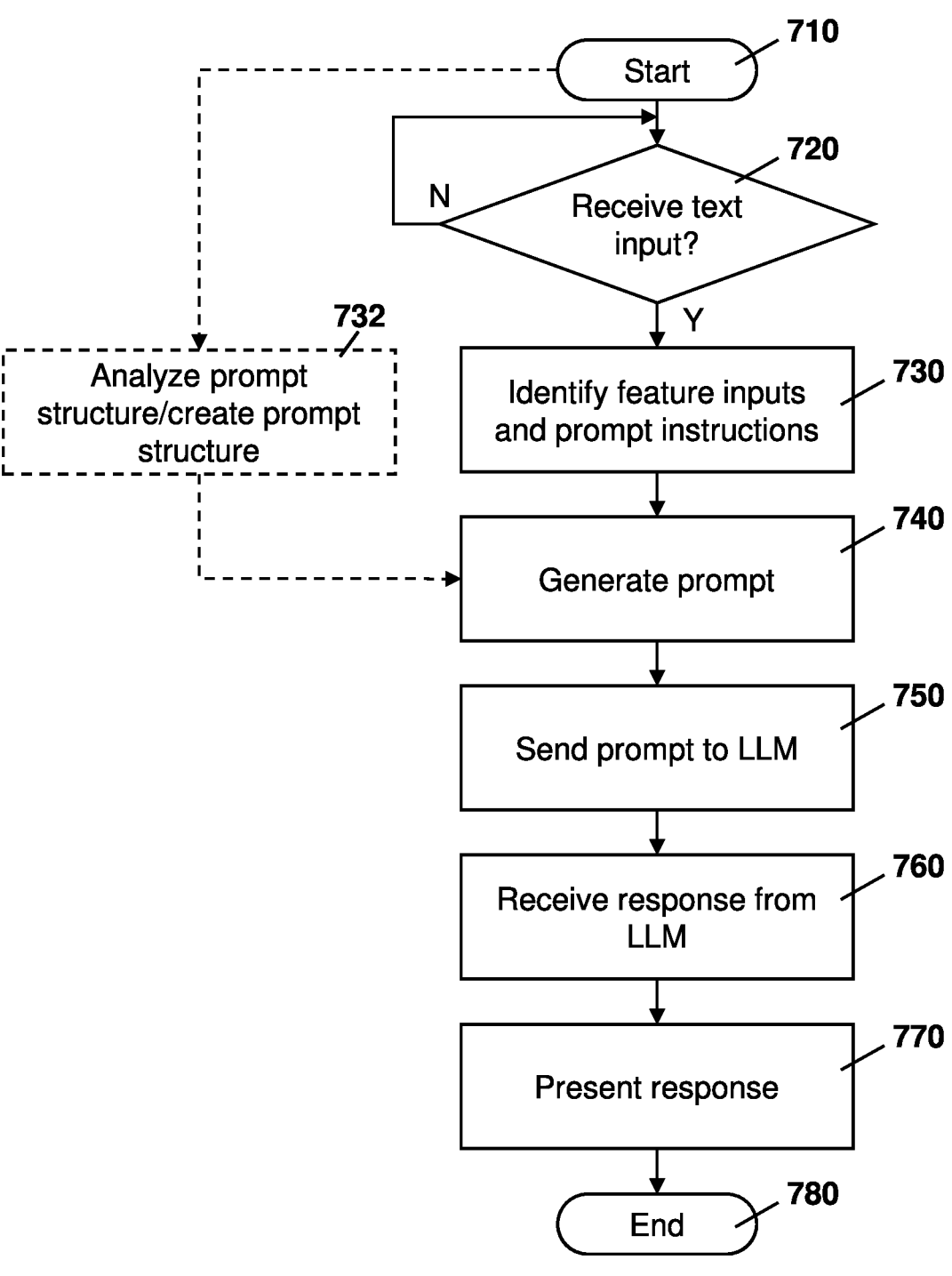
FIG. 7 is a process diagram showing a process for generating a prompt from a text input field.

The process of FIG. 7 starts at block 710 and proceeds to block 720 in which a check is made to determine whether any text input has been received in a text input field of a user interface. This text input field may, for example, be text input area 620 from FIG. 6. The text may be detected to be input based on a graphical user interface, or a text input control of a graphical user interface, among other options.

For example, such input may be detected on a cursor leaving text area 620 from embodiment of FIG. 6. In some cases, the input may be detected based on a user clicking a submit button. Other options are possible.

If no text has been input, the process proceeds to loop at block 720 until a text input is received.

From block 720, once text is received, the process proceeds to block 730 in which the text is analyzed to identify feature inputs and prompt instructions. In particular, this may be accomplished by separating text snippets between those that include a tag and those that do not.

Once the text has been analyzed and divided into feature inputs and prompt instructions, the divided text can be provided to a prompt generator at block 740.

Simultaneously, prompt templates (or prompt structures) for the text input field may exist. As used herein, a "prompt template" is a structured element with placeholders or spaces that may be designated for, for example, a data payload such as feature inputs and/or prompt instructions. A prompt may be, in some cases, created based on the prompt template, and is input to the LLM. In some cases, a prompt template may be derived from or extracted from a prompt for use with future prompts.

Additionally or alternatively, prompts may be provided to a prompt structure analyzer which may, at block 732, analyze the structure of the prompt. Specifically, a prompt structure analyzer determines a prompt template from an existing prompt given to the system, or in some cases may construct or generate a prompt template if no existing prompt (or prompt template) is given.

In the case where no existing prompt template is given, an output expectation may be provided instead that describes the type of response a user is expecting from the text generation platform. For example, the type of response may be a blog, an essay, a product description, a marketing ad, among other options.

Using the given output expectation, the prompt structure analyzer may create a simple prompt template of the format: (1) preamble, (2) list of prompt instructions, and (3) list of feature inputs.

The preamble would explain that the goal is to generate a response that conforms to the given output expectation, such as to write a blog, and would ask the LLM to incorporate the additional instructions from the second section and to base its response on the data given in the third section.

Each section of the prompt template may be separated from the other sections of the prompt template by a distinct sequence of symbols or whitespace. For example, such sequence of symbols may be a series of asterisks (******), number signs (#####), Among other options. White spaces may consist of line breaks, tabs, among the others. The type of section delineation may optionally be explicitly told to the LLM as part of the preamble. For example, the preamble may include a statement that "The markers ***** indicate a section break in this prompt."

In the case where an existing prompt template is given, the existing prompt template may be structured such that it includes one or more separate sections for instructions and one or more separate sections for data. The section(s) for instructions may indicate how the LLM should respond, such as length, tone of voice, specific style, type of response. The data section(s) may provide information and features to be used and incorporated into what the LLM responds with.

For example, reference is now made to FIG. 8 which shows an example prompt template 810.

In the example of FIG. 8, a first section 820 provides instructions. Similarly, a third section 830 also provides instructions.

A second section 840 contains positions or placeholders for one or more data payloads (e.g. product name, product features, and/or other data).

Based on this, the output from block 732 in FIG. 7 may indicate that text snippets for a first type of input should be inserted into the second section 840, while text snippets for a second type of input should be inserted into one or both of first section 820 or third section 830.

Other options are possible.

In some embodiments, the prompt template may be known to the system in advance, and therefore block 732 is optional. Such prompt templates that are known in advance may be pre-parsed into labeled sections, or pointers may be given to locations in the prompt template in which to insert data and or instructions.

If the prompt template is not known to the system, an existing prompt may be analyzed, for example using NLP models to determine what data is expected and where. These steps may be performed at block 732.

In some embodiments, if the prompt template (i.e. resulting from the analysis in block 732) does not include a section for data and/or does not include a section for instructions, a new section may be created at block 732 for the missing section or sections at the bottom of the prompt template. Further, the missing section or sections may be added using the same section break delineation identified. For example, a plurality of asterisks may be provided to divide a data section from an instruction section.

The preamble of the prompt template may also be modified or created to inform the LLM of the new section(s) of instructions and/or data that it must consider.

Thereafter, the identified and/or created sections of the prompt template can be provided as a prompt template to the prompt generation module, which can generate the prompt at block 740.

At block 740, a prompt generator converts the user inputted text snippets into a natural language prompt to the LLM, using injection into the existing or created prompt template.

Each of the non-tagged user-inputted text snippets may be inserted into the data section of the prompt template or appended into any existing data in that section of the prompt template.

For example, reference is now made to FIG. 9, which shows an example prompt 910. Prompt 910 uses both the example prompt template from FIG. 8, as well as the text input from the example of FIG. 6. In this regard, a first section 920 (e.g. corresponding to section 820 of the example prompt template) has been modified to include the instructions provided using tags from the text input field. As will be appreciated by those in the art, this information could have been added to section 930 instead.

A second section 940 (e.g. corresponding to section 840 of the example prompt template) has further been modified to include the data that was untagged from the text input.

The product name could be input either from the same text input box, for example by indicating that the product is named {name}, or from a different text input box in some embodiments.

In the example of FIG. 9, the added text is shown in bold. This is merely provided for illustration and would typically not be bold for provision to the LLM.

Referring again to FIG. 7, once the prompt is generated, in some embodiments the prompt may be sent to an LLM, as shown at block 750 and response may then be received from the LLM at block 760.

The response may be presented to a user on a user interface at block 770. For example, the product description for the product outlined in the text input of FIG. 6, as generated by the text generation platform, may be presented to the user for approval in some embodiments. In other cases, the blog post, paragraphs or other information sought by the user may be presented to the user at block 770.

The process then proceeds to block 780 and ends.

Based on the above, methods and systems are provided which gather a mixture of feature inputs and prompt instructions from the user within the same input field, parse the contents of that input field to distinguish between the two types of input, and inject each type of instruction or text into the appropriate section within a prompt template for a text generation platform.

The above-discussed methods are computer-implemented methods and require a computer for their implementation/ use. Such computer system could be implemented on any type of, or combination of, network elements or computing devices, and may for example use the computing device of FIG. 2.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The invention claimed is:

1. A computer-implemented method for parsing a mix of features inputs and prompt instructions for a prompt, the method comprising:

providing a user interface for receiving text input, the user interface providing for delineation between feature inputs describing content for a Large Language Model (LLM) output and prompt instructions describing a style for the LLM output;

receiving the text input using the user interface, the text input including the feature inputs and the prompt instructions, the prompt instructions being delineated from the feature inputs by one or more tags;

analyzing the text input to identify the feature inputs and the prompt instructions, including parsing the text input to identify the prompt instructions based on the one or more tags;

generating the prompt to be provided to an LLM based on a prompt template, the feature inputs, and the prompt instructions;

sending the prompt to the LLM; and receiving the LLM output from the LLM based on the prompt.

2. The method of claim 1, wherein more than one form of the one or more tags may be used to delineate the prompt instructions.

3. The method of claim 1, wherein the one or more tags comprises a start delimiter, and the start delimiter includes a slash-character.

4. The method of claim 1, wherein the one or more tags comprises an end delimiter, and the end delimiter includes at least one of a carriage return and a line feed.

5. The method of claim 1, wherein the text input is received via a text input control of the user interface.

6. The method of claim 1, wherein the user interface formats at least one of tags and prompt instructions differently from feature inputs and/or using one or more colours different from colours used to present feature inputs.

7. The method of claim 1, wherein the prompt template corresponds to a pre-constructed prompt.

8. The method of claim 1, wherein the prompt template includes one or more sections for providing one or more of the feature inputs and the prompt instructions, and wherein generating the prompt includes inserting the one or more of the feature inputs and the prompt instructions into corresponding ones of the one or more sections.

9. The method of claim 1, wherein the prompt template does not include a section for providing prompt instructions and wherein generating the prompt includes populating the prompt template with the feature inputs and concatenating the populated prompt template with the prompt instructions to form the prompt.

10. The method of claim 9, wherein in the prompt, the populated prompt template and the prompt instructions are separated by a distinct sequence of symbols and/or whitespace.

11. The method of claim 1, wherein generating the prompt to be provided to the LLM comprises using a prompt generator.

12. The method of claim 1, further comprising:

presenting some or all of the response to the generated prompt via a graphical the user interface.

13. A computer system configured for parsing a mix of features inputs and prompt instructions for a prompt, the computer system comprising:

one or more processors;

a user interface; and a computer readable medium storing instructions that when executed by at least one of the one or more processors, cause the computer system to:

provide for receiving text input at the user interface by providing for delineation between feature inputs describing content for a Large Language Model (LLM) output and prompt instructions describing a style for the LLM output;

receive the text input, the text input including the feature inputs and the prompt instructions, the prompt instructions being delineated from the feature inputs by one or more tags;

analyze the text input to identify the feature inputs and the prompt instructions, including parsing the text input to identify the prompt instructions based on the one or more tags;

generate the prompt to be provided to an LLM based on a prompt template, the feature inputs, and the prompt instructions;

send the prompt to the LLM; and receive the LLM output from the LLM based on the prompt.

14. The computer system of claim 13, wherein the computer readable medium is a memory.

15. The computer system of claim 13, wherein more than one form of the one or more tags may be used to delineate the prompt instructions.

16. The computer system of claim 13, wherein the one or more tags comprises a start delimiter, and the start delimiter includes a slash-character.

17. The computer system of claim 13, wherein the one or more tags comprises an end delimiter, and the end delimiter includes at least one of a carriage return and a line feed.

18. The computer system of claim 13, wherein the text input is received via a text input control of the user interface.

19. The computer system of claim 13, wherein the graphical user interface formats at least one of tags and prompt instructions differently from feature inputs and/or using one or more colours different from colours used to present feature inputs.

20. A non-transitory computer readable storage medium storing instructions that, when executed by at least one processor of a computer system, cause the computer system to:

provide a user interface at the computer system for receiving text input at the user interface by providing for delineation between feature inputs describing content for a Large Language Model (LLM) output and prompt instructions describing a style for the LLM output;

receive the text input, the text input including the feature inputs and the prompt instructions, the prompt instructions being delineated from the feature inputs by one or more tags;

analyze the text input to identify the feature inputs and the prompt instructions, including parsing the text input to identify the prompt instructions based on the one or more tags;

generate the prompt to be provided to an LLM based on a prompt template, the feature inputs, and the prompt instructions;

send the prompt to the LLM; and receive the LLM output from the LLM based on the prompt.

* * * * *